Figure 1:
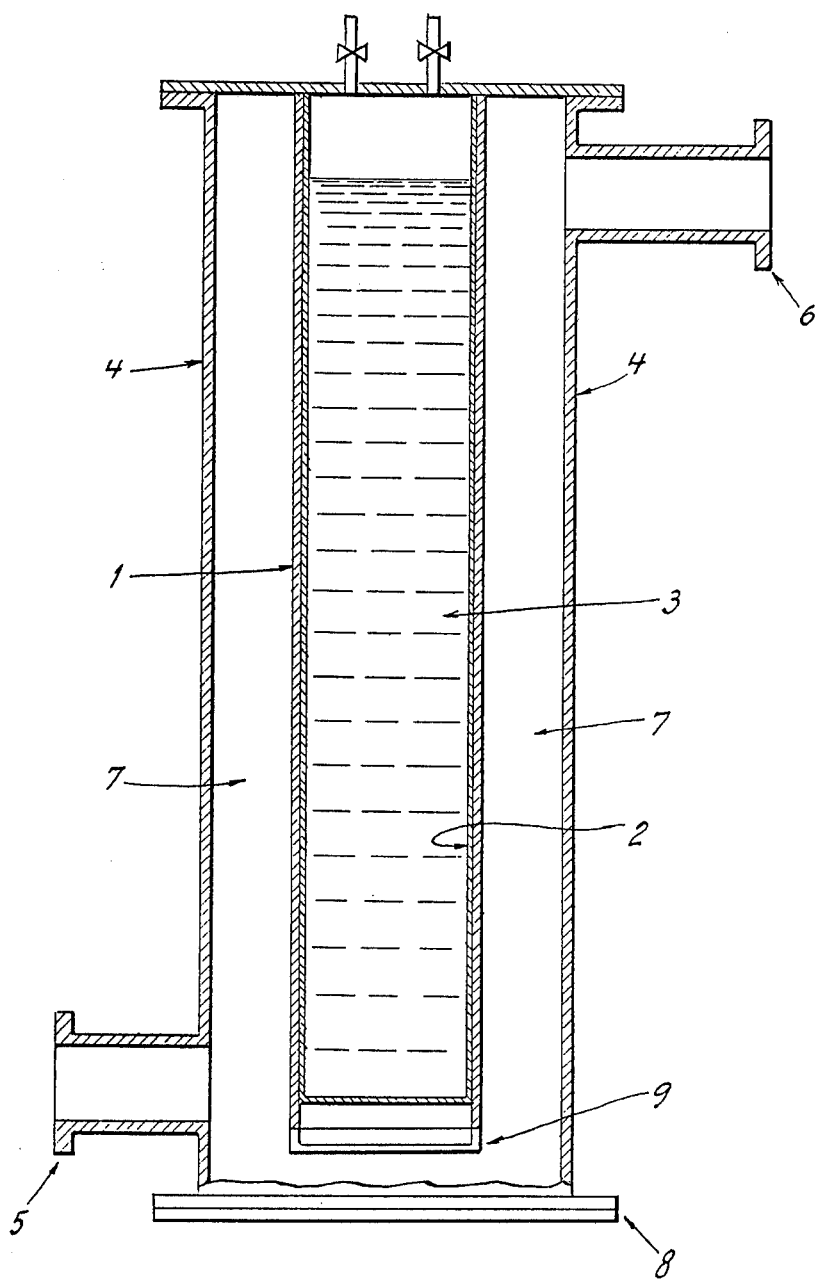

United States Patent [19]

Hurlow et al.

[11] 4,101,681
[45] Jul. 18, 1978

[54] DEAROMATIZATION OF COFFEE OIL

[75] Inventors: Gerald S. Hurlow, Toronto; Jean R. Blain, Montreal; Michael Coombes, Pointe Claire; Jean-Claude Richard, Chateauguay; Patrick W. Hitchinson, Dorval, all of Canada

[73] Assignee: General Foods Limited, Toronto, Canada

[21] Appl. No.: 757,167

[22] Filed: Jan. 6, 1977

[51] Int. Cl.² ............................................. A23F 1/08
[52] U.S. Cl. ................................. 426/387; 426/386; 426/492; 23/294 R; 55/269; 55/82
[58] Field of Search .................... 426/386, 387, 492; 62/340; 202/185 R; 23/294; 55/269, 82

[56] References Cited
FOREIGN PATENT DOCUMENTS 603,954   1/1960   Canada.
1,339,700  12/1973  United Kingdom ................ 426/386

Primary Examiner—Joseph M. Golian
Attorney, Agent, or Firm—Bruno P. Struzzi; Thomas V. Sullivan; Mitchell D. Bittman

[57] ABSTRACT

This invention relates to an improved process for the separation and isolation of coffee aroma constituents from roasted coffee, combining the aroma constituents with an edible substance and subsequently incorporating the aromatized substance in a food product.

The process involves improving the condensation of vapors generated from the distillation of coffee oil by condensing the distilled aroma constituents onto a sleeve cooled by and snugly surrounding a container filled with coolant. The sleeve is removed and the aroma constituents condensed thereon are then preferably combined with an edible substance by manipulating the condensed constituents quickly and efficiently thus minimizing aroma loss and degradation caused by undesirable prolonged contact with air.

15 Claims, 2 Drawing Figures

DEAROMATIZATION OF COFFEE OIL

This invention is predicated on processing improvements in the separation, recovery and concentration of roasted coffee aroma constituents and the subsequent incorporation of the aroma constituents into food products and generally entails an improvement over the process disclosed by Feldman et al. in Canadian Pat. No. 603,954. Through the use of the improvements described herein the Feldman et al. process can be more efficiently practiced.

Some problems that hampered extensive commercial use of the Feldman et al. process were that (1) the condensate could not be removed from the condenser without undesirable prolonged contact with air resulting in the loss and degradation of valuable aroma constituents, (2) the condenser had to be emptied of the cryogenic coolant and warmed every time the condensate had to be removed thus putting a condenser out of action for a prolonged period of time, wasting valuable coolant material, and due to the condenser's large mass it remained cold for extended periods of time thus hampering attempts to remove the condensate, and (3) the physical state of the condensate in the condenser could not be effectively controlled thus making handling difficult as efficient operation makes desirable the formation of solid condensate on the collection surface.

In view of the above-mentioned difficulties encountered with the Feldman et al. process and in order to effect an efficient commercial process for the aromatization of food products, particularly instant coffee, this invention is predicated on processing improvements in the separation, recovery and concentration of roasted coffee aroma constituents and the subsequent incorporation of the concentrated aroma constituents in a food product, particularly instant coffee.

The invention entails subjecting coffee oil in a distillation chamber to distillation at sub-atmospheric pressures and mild temperatures to separate aroma constituents therefrom and condensing said aromatic constituents in a condensing chamber on the outer surface of a heat-conductive sleeve removably and snugly surrounding a heat-conductive container filled with a coolant, then removing the sleeve with the condensed constituents thereon.

The condensed aromatic constituents in the condensing chamber are preferably collected as a solid by maintaining a sufficient pressure in the condensing chamber through the introduction of an inert gas.

The sleeve with the condensed aromatic constituents thereon is then preferably immersed into an edible substance contained in a folding chamber in order to combine the condensed aromatic constituents with the edible substance.

Figure 2:
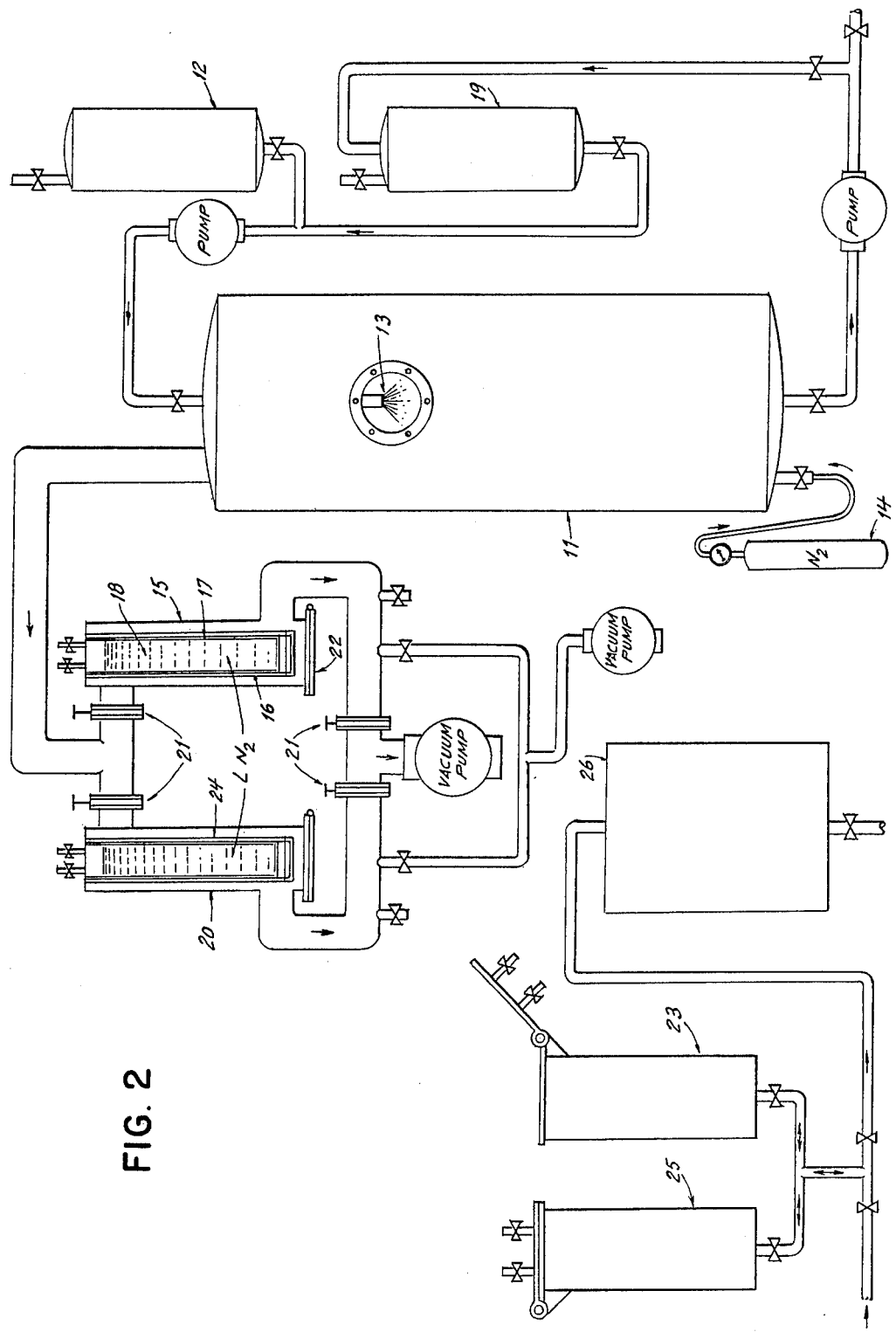

In order that the invention may be more clearly understood, reference will be made to the accompanying drawings in which FIG. 1 is a cross sectional view of the condenser of this invention, and FIG. 2 is a diagramatic sketch of apparatus suitable for carrying out the invention.

Other features and advantages of the invention will be apparent from the following description taken in connection with the accompanying drawings.

Coffee aroma constituents are separated by distilling coffee oil at sub-atmospheric pressures and under mild temperatures and then condensing the separated aroma constituents. The coffee aroma constituents are separated from the oil in such a manner that various desirable aroma constituent fractions can be isolated and subsequently incorporated in a final product in the proportions desired. Low boiling aroma constituents having a fragrance like that of roasted coffee grinder gas and lacking body form the bulk of the initial distilate. Medium boiling aroma constituents and some higher boiling aroma constituents having a burnt or smoky roasted character are also separated from the oil. As a result, the various aroma fractions can be proportioned by controlling the temperature, pressure and period of distillation to provide the desired levels of low, medium, and high boiling aroma constituents to obtain a desired coffee aroma.

Generally, the coffee oil is obtained by expressing roasted coffee at a temperature below 150° C, and preferably at about 130° C. This is a sufficiently elevated temperature compatible with satisfactory yields of coffee oil and aroma therein. The pressures exerted on the coffee to provide a high yield of coffee oil and quality aromas cannot be stated precisely or directly. However, coffee oil is expelled in an acceptable condition using apparatus estimated at exerting 5,000 to 20,000 p.s.i. (approximately 350 to 1400 kg/sq cm) on the coffee. The pressures for adequate oil yield and aroma quality can be determined in terms of the temperatures of the expeller cake or meal and the expressed oil. The expeller cake (expressed roasted coffee or coffee meal) should have a temperature below 150° C and preferably, a temperature of at least about 75° C. The expressed oil should have a temperature ranging from about 25° to 120° C when measured immediately after expression. Adherence to such expeller cake and oil temperatures assures that the necessary pressures have been applied to the coffee to recover oil therefrom without undesirable modification of the aroma constituents therein.

The distillation of the aroma constituents from the expressed coffee oil is preferably carried out within a temperature range of 15° to 100° C with the preferred aroma constituents being distilled at a temperature below about 60° C. The oil is maintained under a reduced pressure in the distillation chamber of generally less than 50 mm and preferably less than 10 mm. The most preferred distillation conditions involves subjecting coffee oil at ambient temperatures (i.e., 20° C to 35° C), to a pressure ranging from 10 mm to about 60 microns.

The oil is preferably introduced into the distillation chamber by a method that maximizes the liquid/gas interfacial area. This allows a maximum of aroma constituents to be distilled in a minimum of time. This method is preferably carried out by atomization of the oil into fine droplets. This can be accomplished by using an impingement type atomizing nozzle that operates by having the oil stream impinge, at high velocity, upon a pin held directly at the exit of the nozzle orifice. Alternatively the oil can be provided in a thin film for distillation; preferably in a rapidly moving film having a thickness ranging from 10 to 100 microns. The process of desorbtion can also be employed to increase the efficiency and degree of separation of the aroma constituents from the oil. Desorbtion involves sweeping the coffee oil with an inert gas such as, for example, nitrogen, carbon dioxide, helium, etc. in the distillation chamber and thereby collecting the more fugitive aromatic constituents.

Referring to FIG. 1 of the drawing the aroma constituents are then carried off as a gas stream and are condensed onto the outer surface of a heat conductive sleeve 1 removably and snugly surrounding a heat-conductive container 2 which has a coolant 3 therein. The heat-conductive sleeve is enclosed by a condensing chamber 4 which has ports 5 and 6 to allow the passage of the aromatic constituents within the space 7 between condensing chamber 4 and the sleeve 1. The condensing chamber 4 also has a removable cover 8 which seals an opening through which the sleeve is removed from the container.

The sleeve is preferably a thin gauge metal and can be kept in place snugly surrounding the container by a number of means. This can include the sleeve being screwed, latched, hooked, etc. in place, or being held in place by friction between the container and the sleeve or by the force of gravity. The container is preferably of metal and is in contact with the sleeve so as to maximize heat conduction between the container and the sleeve. The container is also preferably cylindrical however this is not meant to exclude other desired shapes such as a truncated cone or a rectangular box, with the shape of the sleeve corresponding to the shape of the container.

The coolant within the heat-conductive container can have a temperature ranging from about 0° to about $-269°$ C depending upon what aroma constituents one wants to collect. It is possible though to condense all the aroma constituents with a coolant on the order of $-196°$ C such as liquid nitrogen. Alternatively one may want to set up a fractional condensation system utilizing several stages instead of one by using several of the above condensers in series each operating at a different coolant temperature. For example, a first stage can be cooled to a temperature on the order of 0° to $-15°$ C using a brine solution, while a second stage can be cooled to a temperature on the order of $-80°$ C using solid carbon dioxide as a coolant, while a third stage can be cooled on the order of $-196°$ C using liquid nitrogen.

As the gas stream of volatile aroma constituents enters the condensing chamber 4 through an inlet port 5 it comes into contact with the cooled surface of the sleeve 1 and the aroma constituents which condense form a frost thereon. The constituents of the gas stream which are not condensed exit out of the condensing chamber through an outlet port 6. After sufficient frost has been collected on the sleeve the condensing chamber preferably is isolated, vented (preferably with an inert gas) the cover 8 opened and the sleeve removed, preferably by use of handle 9 on the sleeve. Preferably the apparatus can be so arranged that while one condensing chamber is being isolated another is activated thus providing for a continuously operating condenser system. This can be done by connecting two condensing chambers in parallel, with the required valving, between the distillation chamber and the vacuum source (as shown in FIG. 2).

Through use of this sleeve no significant amount of frost condenses on the container and therefore it is not necessary to remove the coolant from the container to recover the frost. Previously, due to the large mass of the container which collected the frost on its surface, after the coolant was removed the container retained the cold longer and when it was contacted with oil to incorporate the frost into the oil, the oil would freeze onto the container's outer surface and would have to be scraped off. As well as being time consuming, this led to the use of a complicated mechanical scraper and unwanted exposure of the coffee aroma constituents to air. Now, due to the sleeve's low mass and high heat transfer coefficient the frost can be easily and quickly recovered when contacted with oil since there is little if any freezing of the oil on the sleeve's surface, and exposure of the condensed aroma constituents to air can be minimized due to the ease with which the sleeve may be handled. The condenser can also be quickly reactivated after inserting a clean sleeve onto the container.

The condensed aroma constituents on the sleeve can be collected by venting the condensing chamber preferably with an inert gas, then removing the cover of the condensing chamber and taking out the sleeve with the aroma constituents condensed thereon in the form of frost and contacting the constituents with an edible non-volatile fluid substance, e.g., an oil. The edible substance serves as an aroma carrier enabling the aroma constituents to be conveniently added to a food product such as instant coffee. The coffee aroma is preferably folded into the edible substance at a sufficiently high level to enable the concentrated aroma and aroma carrier to be incorporated into the food product without imparting a "wet" appearance or causing poor flowability. The preferred aroma carrier is coffee oil (expressed, solvent extracted or otherwise obtained) which, due to the presence of natural emulsifiers therein, enables large quantities of aroma frost to be combined with or incorporated into the oil. The aroma is preferably added to the coffee oil to obtain a 2- to 10-fold coffee aroma level (aroma from 1 to 9 parts coffee oil combined with 1 part coffee oil), the level also depending upon how much aroma is to be added later to the food product such as instant coffee. Preferably at least a 5-fold level of aromatized oil is added to obtain a desired aroma level in a product such as instant coffee without adversely affecting its appearance and flowability.

This folding (concentrating) step is preferably accomplished by immersing the sleeve with the condensed aroma constituents thereon into an appropriate amount of coffee oil contained in a folding chamber (a chamber capable of being sealed to be fluid and air tight), sealing the chamber from the air, flushing the chamber with an inert gas and then allowing the aroma constituents to combine with the coffee oil. The appropriate amount of expressed coffee oil is determined by the final concentration of aroma desired (i.e. 2- to 10-fold). So that the sleeve can be immersed in the coffee oil it may be desirable, depending upon the appropriate amount of coffee oil, that the folding chamber have a dead space which the sleeve will fit around so as to allow a minimum volume of oil to be in contact with a substantial portion of the condensed aroma constituents on the sleeve's outer surface. This can be carried out by having a vessel in the folding chamber which the sleeve fits around. This vessel occupies sufficient space in the folding chamber so that the appropriate amount of coffee oil in the folding chamber will contact a substantial portion of the condensed aroma constituents on the outer surface of the sleeve.

After sufficient time has elapsed for the aroma constituents to combine with the oil the aromatized oil is transferred from the folding chamber, the seal broken, the sleeve removed and the chamber resealed and recharged with fresh oil and flushed with an inert gas in readiness for another sleeve. By thus having one folding chamber ready per sleeve, the exposure of the aroma constituents to air is minimized to the transfer time of the sleeve from the condensing chamber to the folding chamber. Also the use of this folding chamber provides a simple method for combining the aroma constituents with oil while minimizing contact of the oil and aroma constituents with air.

After the aroma constituents have been combined with the oil the aromatized oil is then preferably blended in another chamber with other aromatized oils in desired proportions thus obtaining a homogenous aromatized oil and minimizing batch to batch variations.

Generally the most preferable aroma constituents from the viewpoint of quality are those recovered as a frost. Further, in order to be able to remove the condensed aroma constituents from the condensing chamber it is also preferred that the aroma constituents be in the solid state, i.e., recovered as a frost. The sleeve permits the collection of the condensed aroma constituents as a frost, so that when one removes the sleeve one also removes all the aroma constituents frosted onto its outer surface. By appropriate adjustment of the temperatures and pressure the liquification of the recovered aroma constituents can be avoided. The coolant temperature can be reduced or the condenser pressure increased. With respect to coffee aroma constituents if the pressure is raised to above approximately 60 microns, (preferably 140 microns,) and the coolant temperature kept at −196° C the condensate is then collected as a frost.

This is preferably accomplished by introducing an inert gas (e.g., nitrogen, carbon dioxide, etc.) at a flow rate effective to control the pressure within the space between the sleeve and the condensing chamber at a level sufficient to keep the condensed aromatic constituents solid. Preferably the inert gas is introduced in the distillation chamber, so as the pressure of the inert gas is controlling the physical state of the condensate in the condensing chamber as a solid, the inert gas is also aiding in the separation of the volatile aromas from the coffee oil in the distillation chamber by the process of desorbtion.

The process of the instant invention can also be employed in the separation of aroma constituents from other types of coffee oils such as solvent-extracted coffee oil.

In order that the present invention may be more clearly understood reference will now be made to the following example and to FIG. 2.

EXAMPLE

The distillation and condensing chambers were totally enclosed and flushed with carbon dioxide, then depressurized to approximately 20 microns, while the first feed tank was charged with 140 pounds of expressed coffee oil.

The expressed coffee oil was obtained by subjecting roasted whole coffee beans to pressures of at least 5,000 p.s.i. in an expeller and wherein said expressed coffee oil recovered from the expressing operation had a temperature ranging from 25° to 120° C and the coffee meal residue had a temperature ranging from 75° to 150° C, the environment of the expressing operation being cooled to a temperature below about 150° C.

The oil was then pumped into the distillation chamber 11 at ambient temperature from the first feed tank 12 at pressures up to approximately 1000 p.s.i.g. through an impingement type atomizing nozzle 13 which operated by having a liquid stream at a high velocity strike a pin held at the exit of the nozzle orifice resulting in a wide angle, hollow cone, fine spray under the vacuum environment of the distillation chamber 11. Meanwhile nitrogen 14 was bled into the distillation chamber in order to maintain a pressure of 140 to 160 microns. This was done to maintain the condensed aroma constituents in the condenser in the solid state and to aid in separation of the aroma constituents from the expressed coffee oil through the process of desorbtion. The 140-pound oil charge was sprayed into the distillation chamber 11 over a period of approximately 60 minutes. As the partially spent oil collected in the bottom of the distillation chamber, it was transferred by pumping to a second feed tank 19 wherein it was heated to a temperature of approximately 66° C.

Isolating a second condensing chamber 20, as the gas stream passed through a first condensing chamber 15 the aroma constituents were condensed onto a thin gauge aluminum sleeve 16 cooled by and snugly surrounding a stainless steel container 17 filled with liquid nitrogen 18.

After the first charge had passed through the distillation chamber 11 once, this first condensing chamber 15 was isolated and a second condensing chamber 20 connected in parallel with the first was put into operation by appropriate valve 21 adjustment. The first condensing chamber 15 was then vented to atmospheric pressure using nitrogen gas and opened by unfastening the hinged cover 22 of the condensing chamber 15. The sleeve 16 was removed manually and immediately placed into a folding chamber 23 with 17.5 pounds of fresh expressed coffee oil therein. The folding chamber was closed and then flushed with carbon dioxide to remove any air.

A clean sleeve was inserted onto the container 17 in the first condensing chamber 15, the chamber was then closed by refastening the hinged cover 22 and depressurized. The first condensing chamber 15 was then ready to be put back into operation as soon as the second condensing chamber 20 was isolated.

The preheated partially stripped oil from the second feed tank 19 was then passed through the distillation chamber 11 in a manner identical to the oil from the first feed tank 12, except that on collection in the bottom of the distillation chamber the totally spent (stripped) oil was transferred to a collection tank rather than a feed tank. From the collection tank this dearomatized oil was either routed to be used as fuel or used in some other desired fashion.

At the end of the second stripping pass, the second condensing chamber 20 was vented to atmospheric pressure using nitrogen gas. The sleeve 24 was then removed and immediately placed into a second folding chamber 25 with 17.5 pounds of freshly expressed coffee oil therein. The folding chamber 25 was closed and flushed with carbon dioxide to remove any air.

The contents of the first folding chamber 23, which had been allowed to sit for approximately 60 minutes, was then transferred to a 35-pound capacity oil pot 26 by applying pressure using carbon dioxide gas to the folding chamber's headspace. The first folding chamber 23 was then opened and the sleeve 17 removed and cleaned. The folding chamber was then closed and charged with 17.5 pounds of fresh oil in readiness for another aroma laden sleeve.

After an additional 60 minutes, the remaining 17.5 pounds of aroma laden oil from the second folding chamber 25 was transferred to the identical 35-pound pot 26, wherein it was blended with the oil from the first folding chamber 23 to produce a homogeneous 35-pound batch of 5-fold oil. As before, the sleeve 24 was removed and cleaned, and a new 17.5-pound charge of fresh coffee oil was placed in the second folding chamber 25.

Using a new charge of 140 pounds of fresh coffee oil, the cycle was then repeated to manufacture another batch of 5-fold oil.

The 5-fold oil was then plated on an instant coffee at a level of less than one percent by weight resulting in a product which has an unusually long storage life during which the original balance, strength and fragrance of the aromas are substantially retained without development of undesirable stale notes.

The embodiments of the invention in which an exclusive property or privilege is claimed are defined as follows:

1. A process of obtaining coffee aroma constituents useful in the aromatization of a foodstuff which comprises:
   (a) subjecting coffee oil in a distillation chamber to distillation at sub-atmospheric pressures and mild temperatures to obtain aroma constituents therefrom;
   (b) condensing said aroma constituents onto the outer surface of a heat-conductive sleeve removably and snugly surrounding a heat-conductive container, said container having a coolant therein and said sleeve being enclosed by a condensing chamber, said condensing chamber having ports for the passage of said aroma constituents within the space between the sleeve and the condensing chamber, and said condensing chamber having a removable cover which seals an opening through which the sleeve is passed when removed from the container;
   (c) removing said cover and taking out said sleeve with the condensed aroma constituents thereon; and
   (d) recovering said condensed aroma constituents.

2. The process of claim 1 further comprising:
introducing an inert gas at a flow rate effective to maintain the pressure within the space between the sleeve and the condensing chamber at a level sufficient to keep the condensed aroma constituents solid.

3. The process of claim 1 further comprising:
introducing an inert gas into the distillation chamber at a flow rate effective to maintain the pressure within the space between the sleeve and the condensation chamber at a level sufficient to keep the condensed aroma constituents solid and to further aid the distillation in the distillation chamber by desorbtion of the aroma constituents from the coffee oil.

4. The process of claim 3 wherein the pressure within the space between the sleeve and the condensing chamber is at least about 60 microns, and said coolant has a temperature of about $-196°$ C.

5. The process of claim 1 wherein said condensed aroma constituents are recovered by:
   (a) immersing said sleeve with said condensed aroma constituents thereon into an appropriate amount of an edible substance contained in a folding chamber;
   (b) sealing said folding chamber from the outside air;
   (c) flushing said folding chamber with an inert gas;
   (d) allowing the sleeve to remain in the edible substance for a period of time effective to allow the condensed aroma constituents to combine with the edible substance.

6. The process of claim 5 wherein said folding chamber has a vessel therein which the sleeve fits around when immersed in the edible substance, said vessel occupying sufficient space so that the appropriate amount of the edible substance is in contact with a substantial portion of the condensed aroma constituents on the outer surface of said sleeve.

7. The process of claim 5 wherein said edible substance is coffee oil.

8. The process of claim 7 wherein said aroma constituents are combined with coffee oil at a 2- to 10-fold level.

9. The process of claim 8 further comprising incorporating said aromatized coffee oil in an instant coffee.

10. The process of claim 1 wherein said coolant has a temperature ranging from about $0°$ to about $-269°$ C.

11. The process of claim 1 wherein said coffee oil is subjected to a distillation temperature below $100°$ C and an absolute pressure less than 50 mm.

12. The process of claim 11 wherein the distillation is conducted by atomizing the coffee oil into the distillation chamber.

13. The process of claim 11 wherein the distillation is conducted by providing a rapidly moving film of the coffee oil in the distillation chamber.

14. The process of claim 1 wherein said coffee oil is an expressed coffee oil obtained by subjecting roasted coffee to pressures of at least 5,000 p.s.i.

15. The process of claim 14 wherein said expressed coffee oil recovered from the expressing operation has a temperature ranging from $25°$ to $120°$ C and the expressed roasted coffee has a temperature ranging from $75°$ to $150°$ C.

* * * * *